US012761389B2

(12) United States Patent
Jones et al.

(10) Patent No.: US 12,761,389 B2
(45) Date of Patent: Oct. 13, 2026

(54) THROUGH CASING SENSOR PLACEMENT

(71) Applicant: Halliburton Energy Services, Inc., Houston, TX (US)

(72) Inventors: Christopher Michael Jones, Houston, TX (US); Ahmed Fouda, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 446 days.

(21) Appl. No.: 18/352,756

(22) Filed: Jul. 14, 2023

(65) Prior Publication Data

US 2025/0020824 A1 Jan. 16, 2025

(51) Int. Cl.
*G01V 1/52* (2006.01)
*E21B 47/01* (2012.01)

(52) U.S. Cl.
CPC ................ *G01V 1/52* (2013.01); *E21B 47/01* (2013.01)

(58) Field of Classification Search
CPC .. G01V 1/52; G01V 1/44; E21B 47/01; E21B 47/12; E21B 47/13; E21B 17/00; E21B 43/11; E21B 47/00; E21B 47/06; E21B 9/00; E21B 7/06
See application file for complete search history.

(56) References Cited

U.S. PATENT DOCUMENTS 5,195,588 A * 3/1993 Dave ........................ E21B 33/13 166/387
5,687,806 A * 11/1997 Sallwasser .............. E21B 7/061 175/81
5,692,565 A * 12/1997 MacDougall ........... E21B 49/00 166/264
5,746,279 A * 5/1998 Havlinek ................ E21B 19/18 175/52
5,779,085 A * 7/1998 Havlinek ................ F16L 55/11 215/361
6,119,782 A * 9/2000 Flores ..................... E21B 23/01 166/212
7,140,434 B2 11/2006 Chouzenoux et al.
7,278,480 B2 10/2007 Longfield et al.
8,286,476 B2 10/2012 Montaron et al.
8,991,245 B2 3/2015 Fields et al.
(Continued)

*Primary Examiner* — Catherine T. Rastovski
*Assistant Examiner* — Toni D Sauncy
(74) *Attorney, Agent, or Firm* — Benjamin Ford; Parker Justiss, P.C.

(57) ABSTRACT

Placing sensors beyond the outer diameter of a casing of a borehole can allow improved sensor data collection of the casing characteristics, such as its bonding to the subterranean formation, of the subterranean formation characteristics such as wettability or porosity, or the reservoir characteristics, such as drainage direction and rate. Sensors can be positioned by drilling a hole through the casing, such as using a drill and inserting the sensor into or through the hole. In some aspects, a sealer, like a resin can be used to fluidly deal the hole. In some aspects, the sensor can be coupled to power or communications located interior of the inner diameter of the casing. In some aspects, the sensor can be wirelessly powered or can wirelessly communicate with other borehole systems. In some aspects, a hole can be made into the subterranean formation to allow sensor placement deeper into the formation.

26 Claims, 7 Drawing Sheets

(56) References Cited

U.S. PATENT DOCUMENTS

| | | | | |
|---|---|---|---|---|
| 2002/0195247 | A1* | 12/2002 | Ciglenec | E21B 23/00 166/250.11 |
| 2004/0238166 | A1 | 12/2004 | Salamitou et al. | |
| 2006/0005965 | A1* | 1/2006 | Chouzenoux | E21B 49/00 166/250.11 |
| 2006/0219401 | A1* | 10/2006 | Longfield | E21B 49/08 166/250.11 |
| 2010/0294480 | A1* | 11/2010 | Lavrut | E21B 7/06 166/66 |
| 2011/0107830 | A1* | 5/2011 | Fields | E21B 49/008 73/152.41 |
| 2011/0186290 | A1* | 8/2011 | Roddy | E21B 47/138 166/253.1 |
| 2011/0192598 | A1* | 8/2011 | Roddy | E21B 47/13 166/253.1 |
| 2012/0186809 | A1* | 7/2012 | Montaron | E21B 49/06 166/250.11 |
| 2015/0167393 | A1* | 6/2015 | Rasheed | E21B 44/005 175/50 |
| 2016/0040524 | A1* | 2/2016 | Ravi | E21B 33/13 166/253.1 |
| 2018/0003850 | A1* | 1/2018 | Jaaskelainen | E21B 17/1021 |

* cited by examiner

THROUGH CASING SENSOR PLACEMENT

TECHNICAL FIELD

This application is directed, in general, to analyzing formations, reservoirs, boreholes, or borehole operations and, more specifically, to using downhole sensors to collect the sensor data.

BACKGROUND

Operators and technicians on-site at a borehole system monitor various conditions of the reservoir, borehole, casing, fluid, and equipment used at the borehole system. Monitoring can include placing sensors downhole the borehole, at various surface locations, on or within equipment used at the borehole, or other sensors, such as satellite data or other sources. The parameters collected from these sensors can be used to monitor the various conditions used at the reservoir or borehole system. The operators, technicians, or other types of users can use this information to make further decisions regarding the operations at the borehole. Currently, sensors are positioned within the borehole, e.g., within an inner diameter of the casing or affixed to the casing in the annulus between the casing and the formation. The casing can cause a reduction in the quality of the sensor data collected, such as because of attenuation or interference. It would be beneficial to increase the accuracy of such sensor collected parameters.

SUMMARY

In one aspect, a system is disclosed. In one embodiment, the system includes (1) one or more sensors capable to collect sensor data, (2) a data receiver, capable to receive the sensor data, and (3) one or more processors, capable to communicate with the data receiver and the one or more sensors, to direct operations of the one or more sensors, and to analyze the sensor data, wherein the one or more sensors are located at least partially through a casing of a borehole located in a subterranean formation.

In a second aspect, a method is disclosed. In one embodiment, the method includes (1) determining a downhole location where one or more sensors can be positioned in a borehole through a subterranean formation, (2) drilling a hole through a casing of the borehole using a drilling system at the downhole location. (3) positioning the one or more sensors in the hole, (4) establishing a power coupling and a communication coupling between the one or more sensors and one or more devices located within an inner diameter of the casing. (5) filling sealant into the hole to form a fluid seal between the inner diameter of the casing and an outer diameter of the casing, and (6) enabling a collection of sensor data from the one or more sensors at a downhole controller or a surface controller.

In a third aspect, a sensor placement system is disclosed. In one embodiment, the sensor placement system includes (1) a transceiver, capable of communicating with a surface controller, (2) a drilling system, located downhole a borehole through a subterranean formation, wherein the drilling system is capable of drilling a casing hole through a casing of the borehole and drilling into the subterranean formation, (3) one or more sensors, capable of communicating with the transceiver, being positioned within the casing hole, and are coupled to a power source located within the borehole and communicatively coupled to a communication device located within the borehole, (4) a sealant injection system, capable of injecting resin into the casing hole to fluidly seal an inner diameter of the casing and an outer diameter of the casing, and (5) wherein the drilling system, the transceiver, and the sealant injection system are part of a downhole tool.

BRIEF DESCRIPTION

Reference is now made to the following descriptions taken in conjunction with the accompanying drawings, in which.

DETAILED DESCRIPTION

Figure 1:
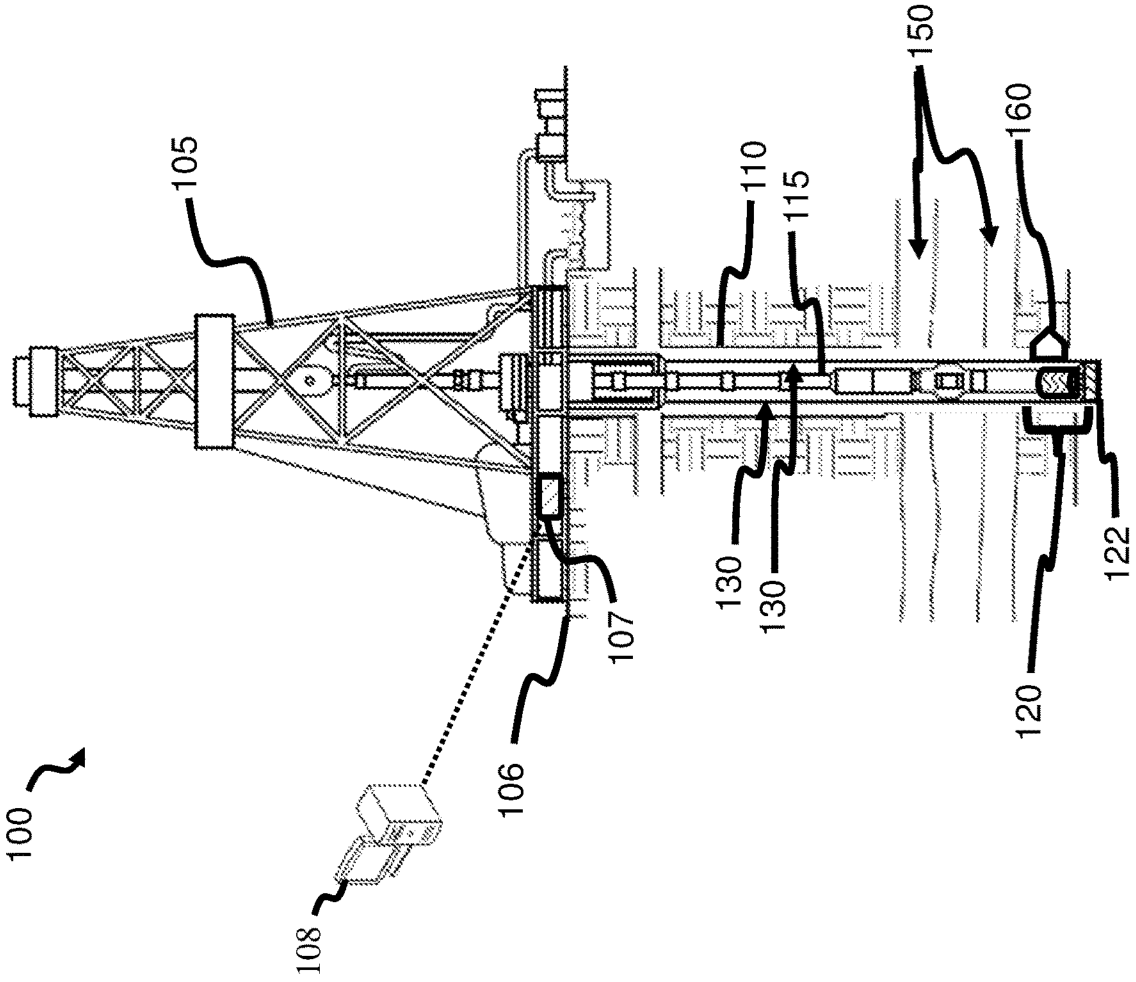
FIG. 1 is an illustration of a diagram of an example drilling system.

Developing a borehole, such as for scientific or hydrocarbon production purposes, can utilize data collected during borehole operations, such as drilling operations, for example, measuring while drilling (MWD), logging while drilling (LWD), seismic while drilling (SWD), and other types of drilling operations. Other borehole operations can be a completed borehole, production operations, production testing operations, interception operations, slickline or wireline operations, coiled tubing remediation, seismic profiling, and other types of borehole operations. The borehole operations can be to produce oil or gas products, or for scientific purposes, research, testing, or other non-hydrocarbon related purpose.

Various types of sensors and tools can be utilized to collect the data, such as magnetic resonance sensors, resistivity sensors, acoustic sensors, nuclear sensors, temperature sensors, pressure sensors, seismic sensors, and other types of sensors. The data can be utilized by various borehole systems. For example, to adjust drilling parameters, to modify pumped borehole fluid, e.g., mud, adjust operations of a geo-steering system for a drilling assembly, adjust production pump out operations, such as adjusting for a change in reservoir drainage, activating or closing zones, or other uses by systems at the borehole.

Data collected from downhole sensors, tool sensors, or surface sensors can be used to analyze the current borehole operation. The analysis can be used to modify operations, alert systems for remediation actions, or trigger alarms for systems or users. The data can be collected and analyzed using algorithms that have been determined by a user or a borehole operation system.

Once casing has been installed downhole a borehole, sensors placed along the borehole wall, along a downhole tool, or along a pipe, drill string, or other conveyance, can experience degraded data collection abilities. The casing can interfere with the operation of the sensor or attenuate the sensor energy, thereby decreasing the quality of the data collected. Many measurement methods are inaccessible or of low sensitivity when measuring subsequent casings or subterranean formations at a depth during production logging. For example, it can be difficult to detect subterranean formation resistivity, compositional changes, or other parameters behind the casing. Acoustic energy can have reduced sensitivity to probe the subterranean formation. It can be difficult to measure pressure directly behind the casing.

This disclosure presents systems and processes for locating sensors on an outside perimeter of the casing (e.g., at or beyond the outer diameter of the casing) or locating sensors within the subterranean formation. The sensors can be utilized, for example, for sensor data collection throughout the life of the well. Sensor data can be collected behind the casing and deeper in the subterranean formation than conventional techniques. Direct receivers can be provided for probing energy from behind the casing for improved evaluation than is possible currently. In some aspects, the sensor data is at least one of one or more of casing characteristics, one or more casing-subterranean formation bond characteristics, one or more subterranean formation characteristics, or one or more reservoir characteristics.

A casing hole can be made, such as drilled, through the casing at a determined location within the borehole. The hole can be made by a downhole tool, such as a drill bit, a logging tool with a drilling component, or other types of downhole tools, assemblies, or drill bits. In some aspects, the sensors can be azimuthally located around the borehole to detect azimuthal changes, for example, a direction of $CO_2$ flood.

One or more sensors, of a various types, can be inserted partially or wholly through the hole to allow at least one part of the sensor to be directly exposed to the subterranean formation. The sensor can be positioned such that the end closest to the borehole can be slightly recessed from the inner diameter of the casing, flush with the inner diameter of the casing, or protruding from the inner diameter of the casing, e.g., extending into the interior space formed by the casing.

In some aspects, the sensor can be a sensor string. In some aspects, the casing hole can be drilled into the subterranean formation allowing the sensor to be placed deeper into the subterranean formation. For example, a hole of two feet to twenty feet can be drilled. Smaller and larger holes can be drilled depending on the need and equipment available.

In some aspects, the sensor can include temperature sensors, pressure sensors, electrode sensors (for example, to detect water chemistry, water pH, $CO_2$ presence, $H_2S$ presence, or other chemical compounds), micro-nuclear magnetic resonance (NMR) sensors, optical sensors, acoustic sensors, electromagnetic (EM) sensors, or other sensor types.

In some aspects, the sensors can evaluate corrosive water conditions prior to intersection with the borehole. In some aspects, the sensors can detect $CO_2$ or water floods before the intersection with the completion zone. In some aspects, the sensors can detect pressure changes or point temperature measurements. In some aspects, the sensors can collect resistivity measurements to evaluate changes further out into the subterranean formation. In some aspects, the sensors can evaluate caking in a near proximal position to the sensor, for example, triangulated by +/−30 feet or another distance parameter. In some aspects, the sensors can be configured to detect ambient acoustic noise to detect fluid flow and approaching fluid flow from a distance. In some aspects, the sensors can detect casing issues or damage.

In some aspects, the sensor can make hydraulic contact with the subterranean formation. In some aspects, the sensor can be fitted with a tube or other mechanism to sample fluid from deeper in the subterranean formation by the production logging tool. In some aspects, the tube can be fitted with a valve able to couple with a mating end that is part of the production logging tool. In some aspects, the tube can be fitted with a check valve to allow automatic opening with sufficient pressure differential not less than the differential between the borehole and the subterranean formation. In some aspects, the sensor can include an indicator that when set to a predetermined value, fluid from the tube can be released into the borehole or into the subterranean formation directly. In some aspects, the tube port can be a direct access point to sample the fluid at a distance in the formation or measure a pressure directly.

In some aspects, a tracer can be used by the sensor. For example, the sensor can release a tracer into the subterranean formation using the fluid tube. As the tracer moves through the reservoir of hydrocarbons, the sensor or other sensors such as located at the surface, can monitor the movement. In some aspects, the tracer can be released into the subterranean formation to trace other characteristics, such as water breakthrough. More than one type of tracer can be released, such as from the same sensor or from different sensors located proximate or distant to each other.

In some aspects, the tracer can be released with other tracers to form a binary code, and to allow ratioing or distribution analysis to guard against concentration changes in the tracer. In some aspects, the tracers can be released in sufficient condition to allow detection by a surface controller, such as a surface sensor or other detection system. In some aspects, the tracer can be released on a timed schedule or by received instruction at the sensor to improve the analysis of the detected tracers by the detection system. In some aspects, the subterranean formation fluid, for example, reservoir fluid, can be sampled and analyzed for the tracers, such as using a tube attached to the sensor to draw in the fluid. In some aspects, a collected sample of fluid can allow the use of a mass spectrometry detection device, which can enable very low detection limits. In some aspects, tracers can be dyes, isotopes, organometallics, or other unique elemental or molecular combinations that is durable and detectable. In some aspects, analytical instrumentation capable of detecting the tracers can include optical instrumentation, chromatography instrumentation, mass spectrometry instrumentation or other types of analytical instrumentation for selected tracers.

In some aspects, the drill tool or drilling system can have a pump to circulate fluid during the drilling process. The drilling system can bring a supply of fluid to circulate, or can use the available fluid in the borehole. In some aspects, the initial drilling tool, for drilling a hole through the casing, can include a second drilling tool, for drilling a hole through the subterranean formation. In some aspects, the initial drilling tool can move during the process of drilling the casing hole in order to conduct the second stage of drilling using the second drilling tool. In some aspects, the drilling tools can be angled to traverse into the formation, can be semi flexible and oriented to drill in at an angle closer to perpendicular to the wellbore, or any other determined angle for the hole.

In some aspects, after the sensor is positioned in the hole, one end of a power cable or wire can be coupled to the sensor with the second end coupled to a power source in the borehole. The power source can be a power cable, a power coupling, a power juncture, a battery, a capacitor, or other types of power sources. In some aspects, power can be supplied to the sensor using induction methods (e.g., wireless power coupling). In some aspects, power can be supplied to the sensor using acoustic methods. In some aspects, the sensor can include a capacitor that can be charged in between uses by the sensor, for example, if a pulse of energy is needed to be released by the sensor at a determined time. In some aspects, a battery can be part of the sensor.

In some aspects, the capacitor or the battery can be recharged from power supplied from a power source in the borehole, for example, using an induction coil, or a wired coupling. In some aspects, the battery of the sensor can be replaced by a production logging tool. This can extend the life of the sensor or provide an alternate method for providing power to the sensor. In some aspects, the production logging tool can replenish battery material directly, for example, by injecting lead acetate or other material into the battery.

In some aspects, after the sensor is positioned in the hole, one end of a communications cable or wire can be coupled to the sensor with the second end coupled to a communication device in the borehole. The communication device can be a communication cable, a communication coupling, a communication juncture, or other types of receivers and transmitters. In some aspects, communications from the sensor to a receiver located in the borehole can utilize wireless methods. In some aspects, communications can be established between the sensor and a transceiver in the borehole using acoustic methods. In some aspects, the sensors can be fitted with an acoustic transmitter or the acoustic sensors can passively listen. In some aspects, the sensors can contain an acoustic transmitter, or EM transmitter, to be detected by the production logging tool upon request from the production logging tool.

In some aspects, using the selected power and communication methods for the sensors, the tools within the borehole, such as production logging tools, can use power and communication methods that will couple to the sensors.

In some aspects, the data collected by the sensor can be stored in a memory or transmitted to a device located within the borehole, such as a communication junction device or a logging tool. In some aspects, the data collected by the sensor can be communicated to a surface controller, such as a well site controller, a reservoir controller, a computing system, or other surface controller.

In some aspects, the hole made through the casing can be filled or blocked using one or more types of hole filler or sealant, such as resin. This can provide a seal to prevent subterranean formation fluids from entering the borehole or prevent borehole fluids from leaving the borehole. In some aspects, the portion of the sensor facing the casing can have one or more holes to allow the resin to flow through to improve the overall fluidly sealing of the casing hole. In some aspects, the sensor can have a plug, seal, block, or other device to prevent the resin from interfering with the data collection abilities of the sensor, e.g., prevent the resin from covering the sensor collection point.

Turning now to the figures, FIG. 1 is an illustration of a diagram of an example drilling system 100, for example, an LWD system, an MWD system, an SWD system, a telemetry while drilling (TWD) system, an injection well system, an extraction well system, and other borehole systems. Drilling system 100 includes a derrick 105, a well site controller 107, and a computing system 108. Well site controller 107 includes a processor and a memory and is configured to direct the operation of drilling system 100. Derrick 105 is located at a surface 106.

Extending below derrick 105 is a borehole 110 with downhole tools 120 at the end of a drill string 115. Downhole tools 120 can include various downhole tools, such as a formation tester or a bottom hole assembly (BHA). At the bottom of downhole tools 120 is a drilling bit 122. Other components of downhole tools 120 can be present, such as a local power supply (e.g., generators, batteries, or capacitors), telemetry systems, sensors, transceivers, and control systems. Borchole 110 is surrounded by subterranean formation 150.

Well site controller 107, or computing system 108 (e.g., surface controllers) which can be communicatively coupled to well site controller 107, can be utilized to communicate with downhole tools 120 (e.g., downhole controllers), such as sending and receiving acoustic data, telemetry, data, instructions, subterranean formation measurements, and other information. Computing system 108 can be proximate to well site controller 107 or be a distance away, such as in a cloud environment, a data center, a lab, or a corporate office. Computing system 108 can be a laptop, smartphone, PDA, server, desktop computer, cloud computing system, other computing systems, or a combination thereof, that are operable to perform the processes described herein.

Well site operators, engineers, and other personnel can send and receive data, instructions, measurements, and other information by various conventional means, now known or later developed, with computing system 108 or well site controller 107. Well site controller 107 or computing system 108 can communicate with downhole tools 120 using conventional means, now known or later developed, to direct operations of downhole tools 120.

Casing 130 can act as a barrier between subterranean formation 150 and the fluids and material internal to borehole 110, as well as drill string 115. Sensors can be located with downhole tools 120, along borehole 110, or at points between surface equipment, such as to monitor the pressure and temperature of the fluid flowing through the pipes. Data from one or more of these sensors can be communicated to the evaluation algorithm analyzer and used as inputs to the selected evaluation algorithms.

In some aspects, downhole tools 120 can include tools sufficient to create a hole through casing 130, such as a first drilling tool. In some aspects, downhole tools 120 can include tools sufficient to create a hole into subterranean formation 150, such as a second drilling tool. One or more sensors 160 can be placed in the hole or holes created. In some aspects, a resin can be applied to create a seal at the casing to prevent borehole fluid from leaving borehole 110 through the hole or subterranean formation fluid from entering borehole 110. In some aspects, sensors 160 can be coupled using a wire or wirelessly to a wire, cable, power junction device, or other device in borehole 110 to provide power to sensors 160. In some aspects, sensors 160 can include one or more batteries to supply power. In some aspects, sensors 160 can be coupled to a communication device, such as a wire, a cable, or a communication junction in borehole 110. This communication can allow sensors 160 to communicate with well site controller 107, computing system 108, or other computing system, device, tool, or controller.

Users can define a sensor evaluation algorithm or select a sensor evaluation algorithm from a source, such as a library or database of sensor evaluation algorithms. A sensor evaluation algorithm system can be used by the user to define or select an appropriate algorithm or algorithms to be used during borehole operations. The sensor evaluation algorithms can define one or more alarms by specifying a threshold for one or more sensor parameters that would trigger an alert.

In some aspects, the sensor evaluation algorithm can combine other data, such as the known composition of the subterranean formation being drilled through, or the composition of the drilling mud or other fluids pumped downhole. The composition of the drilling mud or pumped fluids can be received from other systems of the borehole, for example, a well site controller, a drilling planning system, or a pump system. The composition of the subterranean formation can be received from sensors located downhole, from survey data collected from this or proximate boreholes, or from other geological databases proximate or distant from the borehole.

In some aspects, the sensor evaluation algorithm can communicate the alarm, the threshold used, and the triggering parameters to another system, such as computing system 108 or well site controller 107, where actions can be taken on the alarm or trigger, for example, a change in the flowrate or direction of drainage of a reservoir. In some aspects, corrective action or preventive action can be scheduled for the borehole operation to reduce the risk as identified by the sensor evaluation algorithm or to improve operations, such as to improve reservoir drainage operations. In some aspects, computing system 108 can implement the sensor evaluation algorithm and can receive the sensor data. In some aspects, well site controller 107 can implement the sensor evaluation algorithm and can receive the sensor data. In some aspects, the sensor evaluation algorithm can be partially included with well site controller 107 and partially located with computing system 108. In some aspects, the sensor evaluation algorithm can be located in another system, for example, a data center, a lab, a corporate office, or another location.

Figure 2:
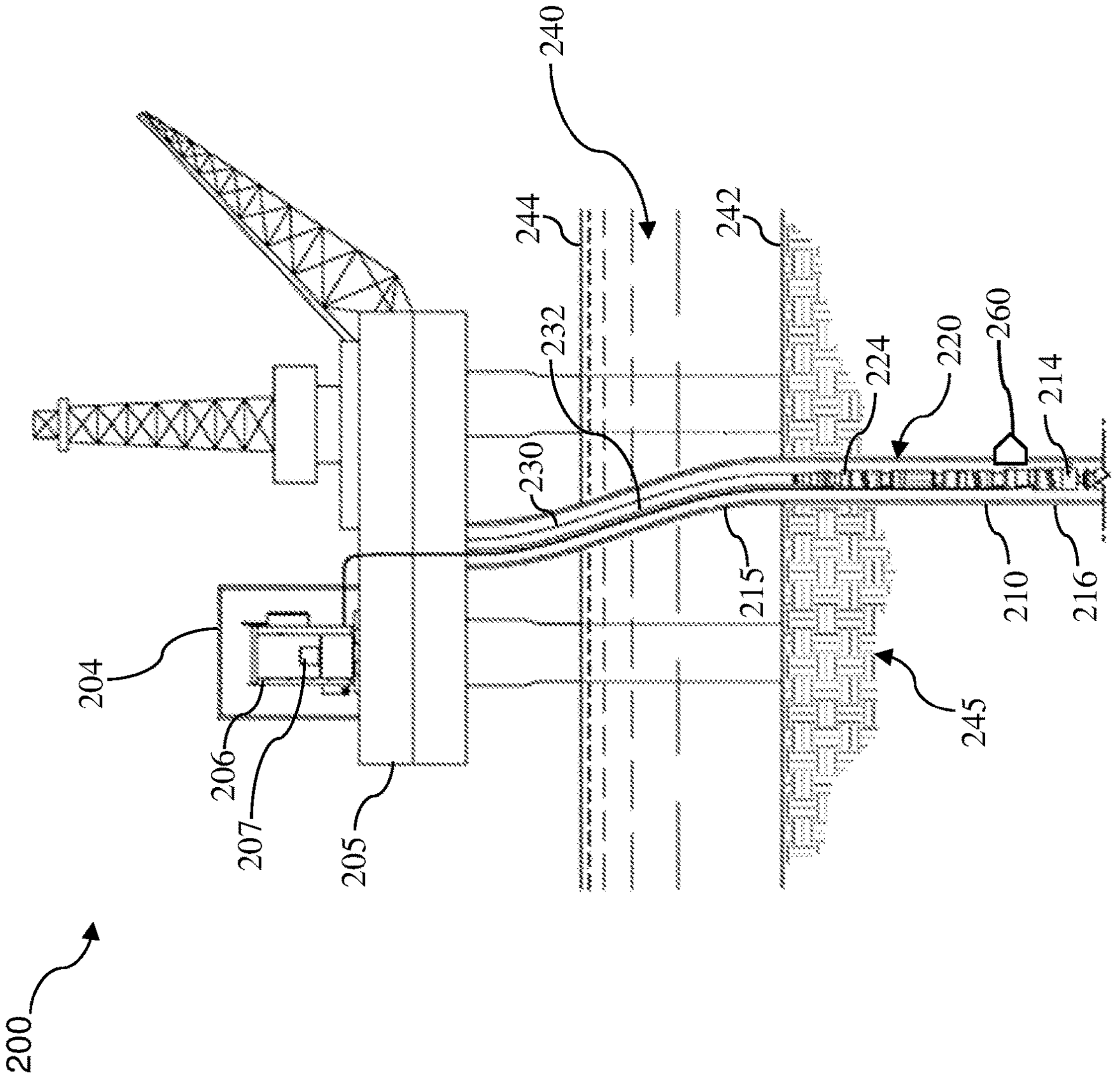
FIG. 2 is an illustration of a diagram of an example offshore system.

FIG. 2 is an illustration of a diagram of an example offshore system 200 with an electric submersible pump (ESP) assembly 220. ESP assembly 220 is placed downhole in a borehole 210 below a body of water 240, such as an ocean or sea. Borehole 210, protected by casing, screens, or other structures, is surrounded by subterranean formation 245. ESP assembly 220 can be used for onshore operations. ESP assembly 220 includes a well controller 207 (for example, to act as a speed and communications controller of ESP assembly 220), an ESP motor 214, and an ESP pump 224.

Well controller 207 is placed in a cabinet 206 inside a control room 204 on an offshore platform 205, such as an oil rig, above water surface 244. Well controller 207 is configured to adjust the operations of ESP motor 214 to improve well productivity. In the illustrated aspect, ESP motor 214 is a two-pole, three-phase squirrel cage induction motor that operates to turn ESP pump 224. ESP motor 214 is located near the bottom of ESP assembly 220, just above downhole sensors within borehole 210. A power/communication cable 230 extends from well controller 207 to ESP motor 214. A fluid pipe 232 fluidly couples equipment located on offshore platform 205 and ESP pump 224.

In some aspects, ESP pump 224 can be a horizontal surface pump, a progressive cavity pump, a subsurface compressor system, or an electric submersible progressive cavity pump. A motor seal section and intake section may extend between ESP motor 214 and ESP pump 224. A riser 215 separates ESP assembly 220 from water 240 until sub-surface 242 is encountered, and a casing 216 can separate borehole 210 from subterranean formation 245 at and below sub-surface 242. Perforations in casing 216 can allow the fluid of interest from subterranean formation 245 to enter borehole 210.

Sensors can be located with ESP assembly 220, along borehole 210, riser 215, equipment located on offshore platform 205, or at points between the various identified tools, such as to monitor the pressure and temperature of the fluid flowing through the pipes. Data from one or more of these sensors can be communicated to the sensor evaluation algorithm and used as inputs to the selected sensor evaluation algorithms.

In some aspects, ESP assembly 220 can include tools sufficient to create a hole through casing 216, such as a first drilling tool. In some aspects, ESP assembly 220 can include tools sufficient to create a hole into subterranean formation 245, such as a second drilling tool. One or more sensors 260 can be placed in the hole or holes created. In some aspects, a resin can be applied to create a seal at the casing to prevent borehole fluid from leaving borehole 210 through the hole or subterranean formation fluid from entering borehole 210. In some aspects, sensors 260 can be coupled using a wire or wirelessly to a wire, cable, power junction device, or other device in borehole 210 to provide power to sensors 260, such as power/communication cable 230. In some aspects, sensors 260 can include one or more batteries to supply power. In some aspects, sensors 260 can be coupled to a communication device, such as a wire, a cable, or a communication junction in borehole 210, such as power/communication cable 230. This communication can allow sensors 260 to communicate with well controller 207, or other computing system, device, tool, or controller.

Parameters (e.g., data) collected from sensors 260 can be communicated to the sensor evaluation algorithm (e.g., performed by one or more processors, such as a downhole controller or a surface controller) to produce results, such as alarms or triggers. The results can be communicated to one or more other systems, such as well controller 207. In some aspects, the sensor data can be transmitted to another system, such as well controller 207. Well controller 207 can implement the evaluation algorithm or include a sensor evaluation algorithm processor or analyzer, or can be a sensor evaluation algorithm controller. In some aspects, the sensor evaluation algorithm analyzer or sensor evaluation algorithm processor, or the sensor evaluation algorithm controller, can be partially in well controller 207, partially in another computing system, or various combinations thereof.

The results of the sensor evaluation algorithm analyzer, sensor evaluation algorithm processor, or sensor evaluation algorithm controller can be used to generate one or more alerts, triggers, or messages, sent to one or more of a user or a borehole system. For example, an alarm can be specified on a temperature measured at a specified location. If the threshold for that temperature parameter is exceeded, then an alert can be communicated to a user or user group. An alert can be sent to a borehole system to take corrective action to lower the risk of a potential event or to improve operations, such as maintaining a consistent reservoir drainage rate.

FIG. 1 depicts onshore operations. Those skilled in the art will understand that the disclosure is equally well suited for use in offshore operations, such as shown in FIG. 2. FIGS. 1-2 depict specific borehole configurations, those skilled in the art will understand that the disclosure is equally well suited for use in boreholes having other orientations including vertical boreholes, horizontal boreholes, slanted boreholes, multilateral boreholes, and other borehole types. FIGS. 1-2 depict a drilling operation, those skilled in the art will understand that the disclosure can apply to drilling operations, production operations, intercept operations, relief well operations, completion operations, hydraulic fracturing operations, MWD operations, LWD operations, SWD operations, open hole completions, completed borehole operations, production testing operations, slickline or wireline operations, coiled tubing remediation, seismic profiling, and other types of borehole operations. The borehole operations can be to produce oil or gas products, or for scientific purposes, research, testing, or other non-hydrocarbon related purpose.

Figure 3:
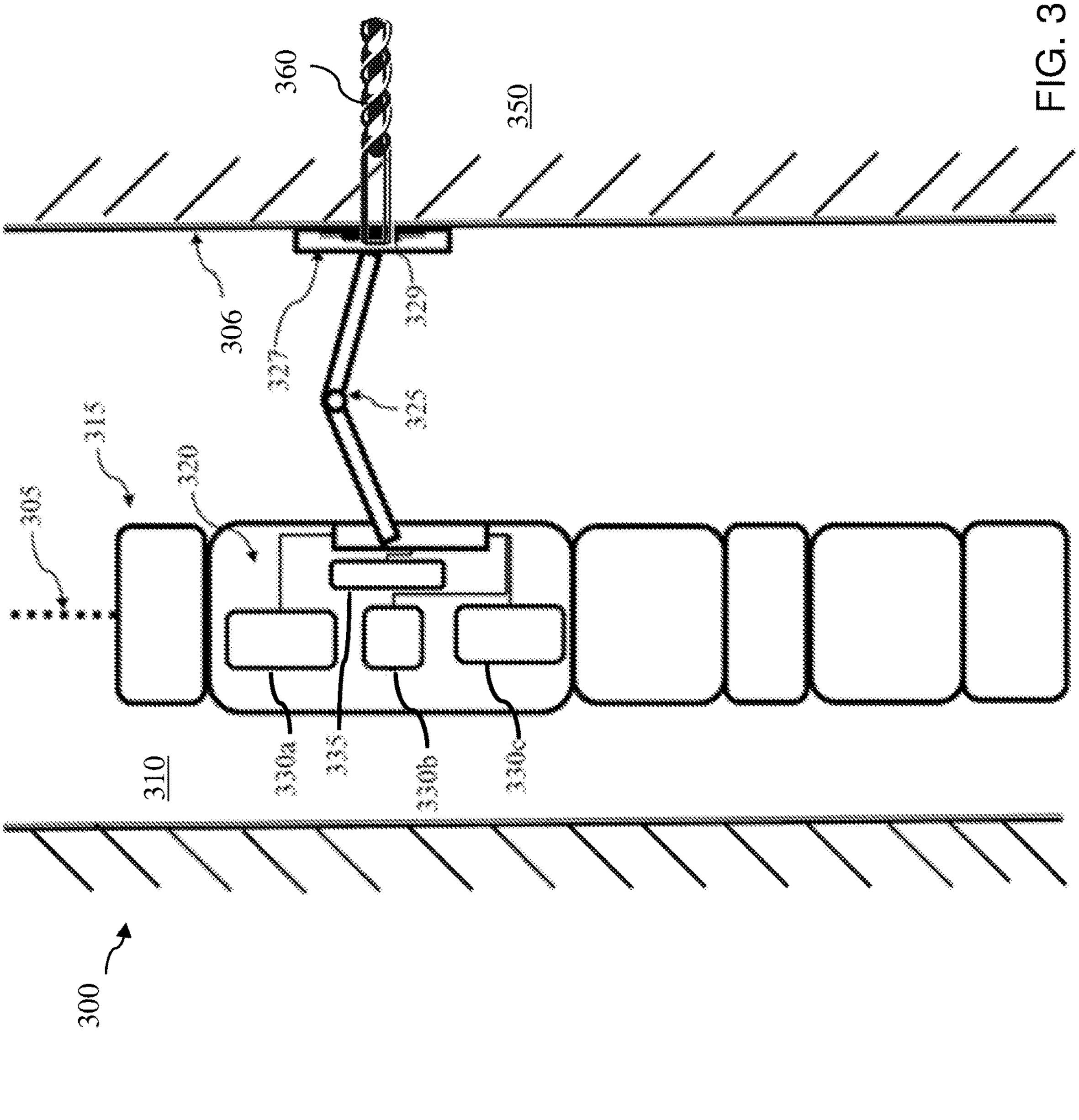
FIG. 3 is an illustration of a diagram of an example sensor placement along a casing using a downhole tool.

FIG. 3 is an illustration of a diagram of an example sensor placement 300 along a casing using a downhole tool 315. Downhole tool 315 can be used by the methods and processes described herein to make a hole through a casing 306 and position a sensor in the hole. The sensor data can collect subterranean formation characteristic data that can be used to derive a determination of a variety of factors, for example, a first formation fluid-second formation fluid boundary, a wettability, a porosity, a permeability parameter, a reservoir drainage parameter, or various other parameters and characteristics, such as using method 500 of FIG. 5. Downhole tool 315 can be a downhole tool assembly, e.g., a permeability tool, a reservoir description tool (RDT), a mini-drill stem tester (DST) system, or other types of downhole tools and can have one or more configurations. Downhole tool 315 is capable of being mechanically, electrically, and communicatively coupled to other downhole tools and surface equipment.

In some aspects, downhole tool 315 can be lowered into position within a borehole 310 by a wireline 305 attached to downhole tool 315. In some aspects, downhole tool 315 can be attached to a drill string, a cable, a pipe, a tube, and other support mechanisms. Borehole 310 can be one of various types of boreholes, such as those illustrated in FIG. 1 or FIG. 2. Downhole tool 315 can provide power to other coupled tools, and provide communications between sensors, tools, and surface equipment, such as controllers, e.g., well site controllers. Attached to downhole tool 315 is a sensor placement system 320. Sensor placement system 320 is mechanically, electrically, and communicatively coupled to downhole tool 315. Attached below sensor placement system 320 can be additional downhole tools, such as other testers, sensors, a geo-steering system, a drill bit assembly, or other types of downhole tools.

In some aspects, sensor placement system 320 can collect subterranean formation data using sensors placed through casing 306. In some aspects, sensor placement system 320 can include a processor or processors, or controller capable of directing the operations of sensor placement system 320, such as sensor system 600 of FIG. 6 or sensor system controller 700 of FIG. 7. In some aspects, sensor placement system 320 can include a processor or processors capable of analyzing various subterranean formation, casing, or borehole characteristics from data received from sensors placed in the hole in casing 306. Sensor placement system 320 can include a communications system to communicate the collected data or the one or more various aforementioned parameters to one or more other systems. The other systems can be located proximate sensor placement system 320, located downhole, or located at a surface location.

Sensor placement system 320 has an articulation arm 325 with a subterranean formation seal 327 and fluid valves 329. Subterranean formation seal 327 is capable of creating a hydraulic seal with the subterranean formation. A drilling system 360 can be used to drill a hole through casing 306 and into subterranean formation 350. One or more sensors can be placed in the drilled hole. Articulation arm 325 can also include a sealant injection system (such as a resin) to seal the hole.

In some aspects, the sensors placed in the hole can utilize one or more tracers or fluids. The tracers or fluids can be stored with the sensor or can be stored in the sensor placement system 320. Injectable fluid storage 330*a*, injectable fluid storage 330*b*, and injectable fluid storage 330*c* (collectively injectable fluid storages 330) can each hold one of various types of injectable fluids, for example a water, chemicals that can be mixed with the water, a hydrocarbon, tracers, or other fluid types. In some aspects, the sensors can extract fluid from the subterranean formation can provide the fluid to an analyzing system, such as through a tube and valve system. A sample storage 335 can hold fluid or core samples taken from the subterranean formation for analysis by sensor placement system 320 or for transportation to the surface where other systems can perform the analysis. In some aspects, there can be fewer or additional storage systems for storing injectable fluids or storing retrieved fluids. In some aspects, there can be separate storage areas for core samples. Articulation arm 325 can place subterranean formation seal 327 along an exposed area a subterranean formation 350 or along casing 306.

Figure 4:
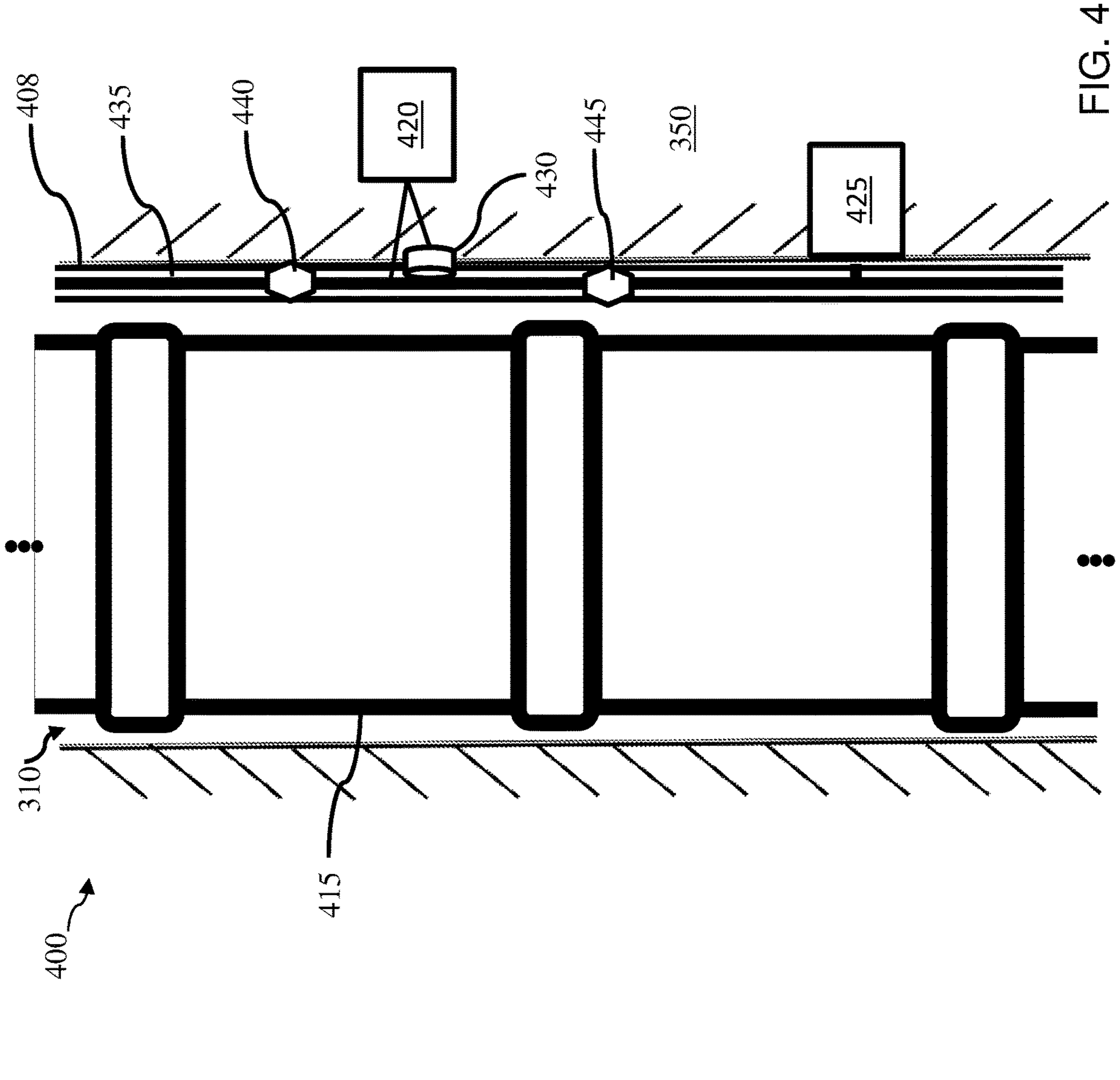
FIG. 4 is an illustration of a diagram of an example sensor power and communication system.

FIG. 4 is an illustration of a diagram of an example sensor power and communication system 400. Sensor power and communication system 400 is demonstrating borehole 310 with tubing 415 inserted through borehole 310. Borehole 310 can be a drilling borehole, a production borehole, a scientific borehole, a logging or monitoring borehole, or other types of boreholes. Borchole 310 has a casing 408 installed along its length.

Sensor placement system 320 has previously placed a sensor 420 several feet into subterranean formation 350, and placed sensor 425 proximate casing 408. There can be zero or more additional sensors located at one or more azimuths or depths along borehole 310. In some aspects, sensor 420 can be coupled to an optional device 430, such as an induction coil for power (e.g., an induction power system) or a communication device. In some aspects, optional device 430 can be coupled to cable 435 for power or communication needs. In some aspects, sensor 420 can be directly coupled to cable 435. In some aspects, sensor 420 can be wirelessly coupled to an optional device 440, such as a communications hub, located along casing 408 or located along tubing 415. Sensor 420 can collect data over various time periods, for example, minutes, days, weeks, or months. For example, a change in drainage of a reservoir can be monitored over weeks or months. In aspects where the time period is longer, sensor 420 can utilize a recharge process to build energy for a large release at periodic intervals, as opposed to smaller energy releases that can be done more frequently. In some aspects, various combinations of the above aspects can be utilized.

In this example, sensor 425 is shown being directly coupled to cable 435. An optional second junction device 445 is shown, such as a communications repeater to allow communications from sensor 425 to systems or devices uphole.

Figure 5:
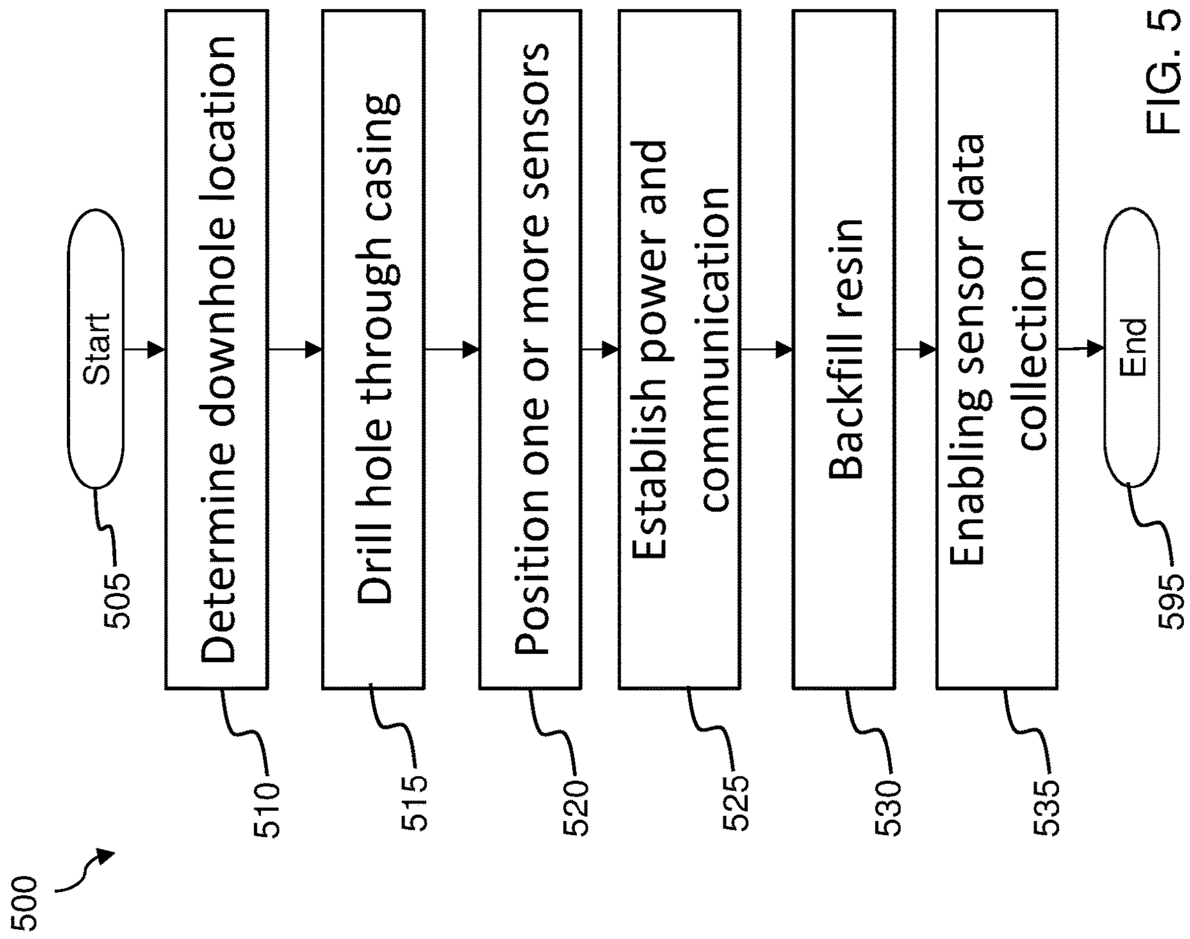
FIG. 5 is an illustration of a flow diagram of an example method to collect data using through casing sensors.

FIG. 5 is an illustration of a flow diagram of an example method 500 to collect data using through casing sensors. Method 500 can be performed using a sensor placement system and a computing system, for example, sensor system 600 of FIG. 6 or sensor system controller 700 of FIG. 7. The computing system can be the sensor placement system, a well site controller, a geo-steering system, a reservoir controller, a data center, a cloud environment, a server, a laptop, a mobile device, a smartphone, a PDA, or other computing systems. Portions of method 500 can be encapsulated in software code or in hardware, for example, an application, code library, dynamic link library, module, function, RAM, ROM, and other software and hardware implementations. The software can be stored in a file, database, or other computing system storage mechanism. Portions of method 500 can be partially implemented in software and partially in hardware. Method 500 can perform the steps for the described processes, for example, one or more of locating a position to place a sensor, drilling a casing hole through the casing, placing one or more sensors, coupling the sensor to power or communications, and enabling the sensors to collect sensor data.

Method 500 starts at a step 505 and proceeds to a step 510. In step 510, a location can be determined downhole a borehole for where one or more sensors can be positioned. The location can be proximate the casing or it can be a distance into the subterranean formation. In a step 515, a hole can be made, such as using a drilling system, through the casing. In some aspects, the same or different drilling system can be used to drill a specified distance into the subterranean formation. Sensors can be placed along the outer diameter of the casing, or a distance into the subterranean formation.

In a step 520, one or more sensors, for example, a sensor string, can be positioned in the hole. The sensor end toward the casing can be flush, recessed, or protruding from the hole into the interior area of the casing (e.g., inside the inner diameter of the casing). In a step 525, in some aspects where power or communications need to be established, a wire or cable can be coupled to the sensor, with the other end of the wire or cable coupled to a system within the inner diameter of the casing, such as a wire, cable, or junction device. In some aspects, step 525 can establish wireless power, such as using an induction coil, or establish wireless communications with a communication device within the borehole, such as a communication junction device or communications repeater. In some aspects, step 525 can establish a fluid coupling, such as if tracers or fluids are to be inserted or injected into the subterranean formation, or if fluid is to be extracted from the subterranean formation for further analysis or testing.

In a step 530, if needed, resin or other types of sealers can be injected into the hole to create a fluid seal between the fluid interior of the borehole and fluid in the subterranean formation. In a step 535, the sensor or sensors can be enabled so that sensor data can be received and used for analysis of the casing, the subterranean formation, or a reservoir. For example, the sensor data can be used to adjust operation plans of the borehole. If the reservoir drainage flow rate or direction changes in a negative way for borehole operations, the operation plan can be updated to shut down a production zone, or open a production zone, to improve the reservoir drainage parameters for borehole productivity. Method 500 ends at a step 595.

Figure 6:
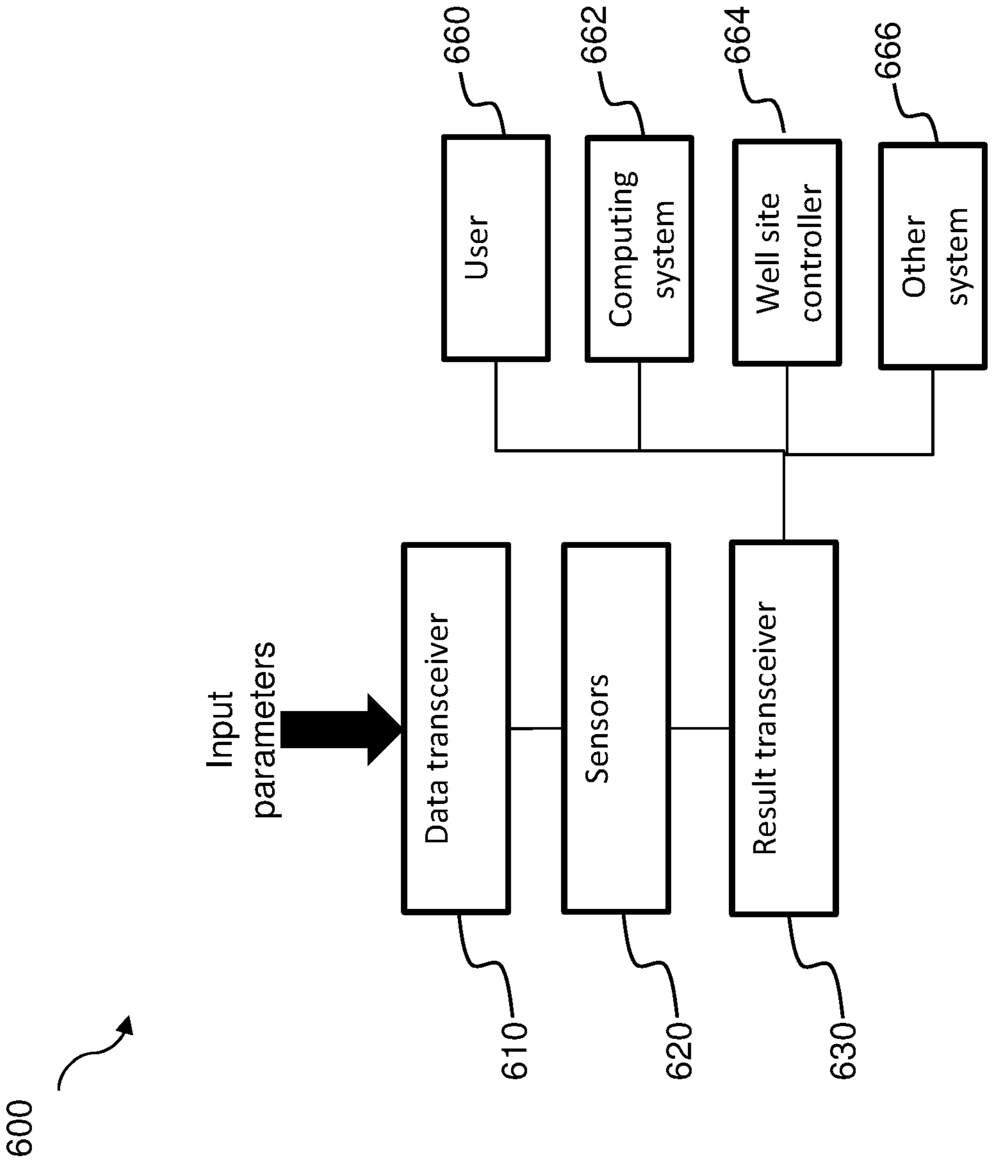
FIG. 6 is an illustration of a block diagram of an example sensor system.

FIG. 6 is an illustration of a block diagram of an example sensor system 600, which can be implemented in one or more computing systems, for example, a data center, cloud environment, server, laptop, smartphone, tablet, and other computing systems. In some aspects, sensor system 600 can be implemented using a sensor controller such as sensor system controller 700 of FIG. 7. Sensor system 600 can implement a portion of one or more methods of this disclosure, such as method 500 of FIG. 5.

Sensor system 600, or a portion thereof, can be implemented as an application, a code library, a dynamic link library, a function, a module, other software implementation, or combinations thereof. In some aspects, sensor system 600 can be implemented in hardware, such as a ROM, a graphics processing unit, or other hardware implementation. In some aspects, sensor system 600 can be implemented partially as a software application and partially as a hardware implementation. Sensor system 600 is a functional view of a portion of the disclosed processes and an implementation can combine or separate the described functions in one or more software or hardware systems, such as using a separate sensor placement system to position the sensors.

Sensor system 600 includes a data transceiver 610, sensors 620, and a result transceiver 630. The results, e.g., the collected sensor data from sensors 620 can be communicated to a data receiver, such as one or more of a user or user system 660, a computing system 662, a well site controller 664, or other processing or storage systems 666. The results can be used as inputs into a well site controller or other borehole system, such as a borehole operation system, where decisions on future stages of the operation plan can be made, for example, updates or adjustments to the plan can be made.

Data transceiver 610 can receive input parameters, such as parameters to direct the operation of the sensors 620, for example, a timing for performing a data collection when a burst of transmission is needed or if a tracer is released into the reservoir or subterranean formation. In some aspects, data transceiver 610 can be part of sensors 620.

Result transceiver 630 can communicate one or more results, analysis, or interim outputs, to one or more data receivers, such as user or user system 660, computing system 662, well site controller 664, storage system 666, e.g., a data store or database, or other related systems, whether located proximate result transceiver 630 or distant from result transceiver 630. Data transceiver 610, sensors 620, and result transceiver 630 can be, or can include, conventional interfaces configured for transmitting and receiving data. In some aspects, sensors 620 can be a machine learning system, such as applying learned analyzation models to the collected sensor data to improve the determination of whether an alarm should be triggered.

Sensors 620 (e.g., one or more processors such as processor 730 of FIG. 7) can be used to implement the methods and processes as described herein. A memory or data storage of sensors 620 can be configured to store the processes and algorithms for directing the operation of sensors 620. Sensors 620 can also include one or more processors that are configured to operate according to the analysis operations and algorithms disclosed herein, and an interface to communicate (transmit and receive) data.

Figure 7:
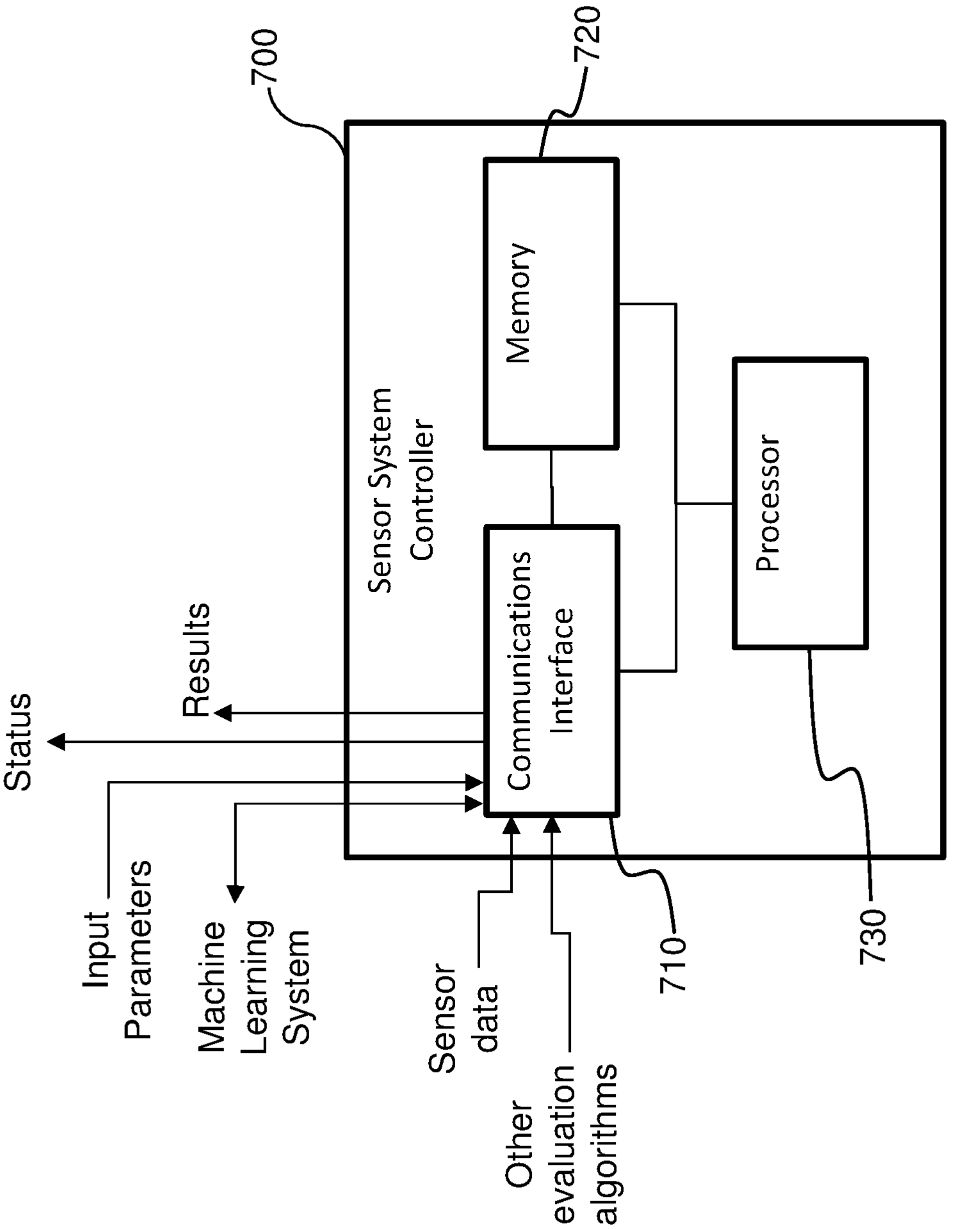
FIG. 7 is an illustration of a block diagram of an example of a sensor controller according to the principles of the disclosure.

FIG. 7 is an illustration of a block diagram of an example of an sensor system controller 700 according to the principles of the disclosure. Sensor system controller 700 can be stored on a single computer or multiple computers. The various components of sensor system controller 700 can communicate via wireless or wired conventional connections. A portion or a whole of sensor system controller 700 can be located at one or more locations and other portions of sensor system controller 700 can be located on a computing device or devices located at a surface location. In some aspects, sensor system controller 700 can be wholly located at a surface or distant location. In some aspects, sensor system controller 700 can be part of another system, and can be integrated into a single device, such as a part of a borehole operation system, a well site controller, or other borehole system or surface controller.

Sensor system controller 700 can be configured to perform the various functions disclosed herein including receiving input parameters, sensor data, and generating results from an execution of the methods and processes described herein, such as collecting sensor data that can be used as inputs into other systems, such as to determine if adjustments are needed to later stages of a borehole operation plan. Sensor system controller 700 includes a communications interface 710, a memory 720, and a processor 730.

Communications interface 710 is configured to transmit and receive data. For example, communications interface 710 can receive the input parameters, sensor data, and other evaluation algorithms. Communications interface 710 can transmit the results, data from the input parameters, or interim outputs. In some aspects, communications interface 710 can transmit a status, such as a success or failure indicator of sensor system controller 700 regarding receiving the various inputs, transmitting the generated results, or producing the results.

In some aspects, communications interface 710 can receive input parameters from a machine learning system, for example, where the sensor data is processed using one or more filters and algorithms and the machine learning system uses prior learned analyzation models to improve the fidelity of the collected sensor data.

In some aspects, the machine learning system can be implemented by processor 730 and perform the operations as described by sensors 620. Communications interface 710 can communicate via communication systems used in the industry. For example, wireless or wired protocols can be used. Communication interface 710 is capable of performing the operations as described for data transceiver 610 and result transceiver 630 of FIG. 6.

Memory 720 can be configured to store a series of operating instructions that direct the operation of processor 730 when initiated, including the code representing the algorithms for determining and processing the collected data. Memory 720 is a non-transitory computer-readable medium. Multiple types of memory can be used for data storage and memory 720 can be distributed.

Processor 730 can be configured to produce the results (e.g., collecting the sensor data and using it as inputs into other processes and systems), one or more interim outputs, and statuses utilizing the received inputs. Processor 730 can be configured to direct the operation of sensor system controller 700. Processor 730 includes the logic to communicate with communications interface 710 and memory 720, and perform the functions described herein. Processor 730 is capable of performing or directing the operations as described by sensors 620 of FIG. 6. Processor 730 can be one or more processors and be of one or more types of processors.

Various figures and descriptions can demonstrate a visual display of the acoustic data and the resulting analysis of the acoustic data. In some aspects, the visual display can be utilized by a user to determine the next steps of the analysis. In some aspects, the visual display does not need to be generated, and a system, such as a machine learning system, can perform the analysis using the received data. In some aspects, a visual display and a machine learning system can be utilized. In some aspects, the acoustic data or partially analyzed acoustic data can be transmitted to one or more surface computing systems, such as a well site controller, a computing system, or other processing system. The surface controller, e.g., surface system or surface systems, can perform the analysis and can communicate the results to one or more other systems, such as a well site controller, a well site operation planner, a geo-steering system, or another borehole system.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate array (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that has program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Configured or configured to means, for example, designed, constructed, or programmed, with the necessary logic and/or features for performing a task or tasks. Examples of program code include both machine code, such as produced by a compiler, and files containing higher-level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects disclosed in the SUMMARY can have one or more of the following additional elements in combination. Element 1: a drilling system, capable of drilling a casing hole through the casing or into the subterranean formation. Element 2: wherein the one or more sensors are positioned within the casing hole. Element 3: wherein the drilling system has a first drilling system capable of drilling through the casing and a second drilling system capable of drilling into the subterranean formation. Element 4: a sealant injection system, capable of filling in the casing hole after the one or more sensors have been positioned to form a fluid seal. Element 5: wherein the sealant injection system utilizes a resin. Element 6: an induction power system, capable of being coupled to the one or more sensors to provide power to the one or more sensors, and receiving power from a device located within an interior of an inner diameter of the casing. Element 7: a power junction device, capable of being coupled to the one or more sensors, providing power to the one or more sensors. Element 8: wherein the power junction device is located along an inner diameter of the casing. Element 9: wherein the one or more sensors include one or more batteries or one or more capacitors. Element 10: a communication device, capable of being communicatively coupled to the one or more sensors using a wired or a wireless coupling, and coupled to the data receiver. Element 11: wherein the communication device is located along an inner diameter of the casing. Element 12: wherein the one or more processors and the data receiver are located downhole the borehole as part of downhole tools. Element 13: wherein the one or more processors and the data receiver are located with a surface controller. Element 14: wherein the one or more sensors are wholly positioned within the subterranean formation. Element 15: wherein the one or more sensors are positioned outside of an outer diameter of the casing. Element 16: wherein the one or more sensors are positioned with one end flush with an inner diameter of the casing. Element 17: wherein the sensor data includes data of at least one characteristic of the casing, at least one characteristic of a bond between the subterranean formation and the casing, at least one characteristics of the subterranean formation, or at least one characteristic of a reservoir proximate the one or more sensors. Element 18: wherein the one or more processors are further capable to adjust an operation plan of the borehole or direct operations of borehole equipment utilizing the analysis of the sensor data. Element 19: wherein the one or more processors are part of a surface controller, a well site controller, a reservoir controller, or a computing system. Element 20: wherein the one or more sensors further comprise a fluid system, capable of injecting into or retrieving a fluid from the subterranean formation. Element 21: wherein the fluid that is injected is monitored or the fluid that is retrieved is analyzed by the one or more sensors. Element 22: wherein the fluid is a tracer that is injected into the subterranean formation. Element 23: wherein the one or more sensors are one or more of magnetic resonance sensors, resistivity sensors, acoustic sensors, nuclear sensors, temperature sensors, pressure sensors, or seismic sensors. Element 24: wherein the drilling the hole includes drilling into the subterranean formation a specified distance. Element 25: wherein the power coupling and the communication coupling utilizes wireless methods. Element 26: wherein the downhole controller or the surface controller utilize the sensor data to direct operations of borehole equipment located at the borehole. Element 27: wherein the sensor data is at least one of one or more of casing characteristics, one or more casing-subterranean formation bond characteristics, one or more subterranean formation characteristics, or one or more reservoir characteristics.

What is claimed is:

1. A system, comprising:

one or more sensors capable to collect sensor data;

a data receiver capable to receive the sensor data; and one or more processors capable to communicate with the data receiver and the one or more sensors, to direct operations of the one or more sensors, and to analyze the sensor data, wherein the one or more sensors are positioned in a subterranean formation having a borehole and separated from a casing of the borehole, the one or more sensors have a first side facing the casing, and the first side of each sensor in the one or more sensors has one or more flow paths allowing a sealant to flow through at least a portion of each of the one or more sensors.

2. The system as recited in claim 1, further comprising:

a sealant injection system, capable of filling in a casing hole after the one or more sensors have been positioned to form a fluid seal, and to deliver the sealant to the first side of each sensor in the one or more sensors.

3. The system as recited in claim 1, wherein each sensor in the one or more sensors has plug or block to prevent the sealant from interfering with the data collection ability of each sensor.

4. The system as recited in claim 1, further comprising:

a drilling system, capable of drilling a casing hole through the casing or into the subterranean formation, wherein the one or more sensors are positioned in the subterranean formation through the casing hole.

5. The system as recited in claim 4, wherein the drilling system has a first drilling system capable of drilling through the casing and a second drilling system capable of drilling into the subterranean formation.

6. The system as recited in claim 1, further comprising:

an induction power system, capable of being coupled to the one or more sensors to provide power to the one or more sensors, and receiving power from a device located within an interior of an inner diameter of the casing.

7. The system as recited in claim 1, further comprising:

a power junction device, capable of being coupled to the one or more sensors, providing power to the one or more sensors, and located along an inner diameter of the casing.

8. The system as recited in claim 1, wherein the one or more sensors include one or more batteries or one or more capacitors.

9. The system as recited in claim 1, further comprising:

a communication device, capable of being communicatively coupled to the one or more sensors using a wired or a wireless coupling, and coupled to the data receiver, wherein the communication device is located along an inner diameter of the casing.

10. The system as recited in claim 1, wherein the one or more processors and the data receiver are located downhole the borehole as part of downhole tools.

11. The system as recited in claim 1, wherein the one or more processors and the data receiver are located with a surface controller.

12. The system as recited in claim 1, wherein the one or more sensors are wholly positioned within the subterranean formation.

13. The system as recited in claim 1, wherein the one or more sensors are positioned at least one foot outside of an outer diameter of the casing.

14. The system as recited in claim 1, wherein the sensor data includes data of at least one characteristic of the subterranean formation or at least one characteristic of a reservoir proximate the one or more sensors.

15. The system as recited in claim 1, wherein the sensor data includes data of at least one characteristic of the casing or at least one characteristic of a bond between the subterranean formation and the casing.

16. The system as recited in claim 1, wherein the one or more processors are further capable to adjust an operation plan of the borehole or direct operations of borehole equipment utilizing the analysis of the sensor data.

17. The system as recited in claim 1, wherein the one or more processors are part of a surface controller, a well site controller, a reservoir controller, or a computing system.

18. The system as recited in claim 1, wherein the one or more sensors further comprise:

a fluid system, capable of injecting into or retrieving a fluid from the subterranean formation, wherein the fluid that is injected is monitored or the fluid that is retrieved is analyzed by the one or more sensors.

19. The system as recited in claim 18, wherein the fluid is a tracer that is injected into the subterranean formation.

20. The system as recited in claim 1, wherein the one or more sensors are one or more of magnetic resonance sensors, resistivity sensors, acoustic sensors, nuclear sensors, temperature sensors, pressure sensors, or seismic sensors.

21. A method, comprising:

determining a downhole location where one or more sensors can be positioned in a borehole through a subterranean formation;

drilling a hole through a casing of the borehole using a drilling system at the downhole location;

positioning the one or more sensors through in the hole and within the subterranean formation, wherein the one or more sensors are separated from the casing of the borehole;

establishing a power coupling and a communication coupling between the one or more sensors and one or more devices located within an inner diameter of the casing;

filling sealant into the hole to form a fluid seal between the inner diameter of the casing and an outer diameter of the casing, wherein the one or more sensors have a first side facing the casing, and the first side of each sensor in the one or more sensors has one or more flow paths allowing the sealant to flow through at least a portion of each sensor in the one or more sensors; and enabling a collection of sensor data from the one or more sensors at a downhole controller or a surface controller.

22. The method as recited in claim 21, wherein the drilling the hole includes drilling into the subterranean formation a specified distance.

23. The method as recited in claim 21, wherein the power coupling and the communication coupling utilizes wireless methods.

24. The method as recited in claim 21, wherein the downhole controller or the surface controller utilize the sensor data to direct operations of borehole equipment located at the borehole.

25. The method as recited in claim 21, wherein the sensor data is at least one of one or more of casing characteristics, one or more casing-subterranean formation bond characteristics, one or more subterranean formation characteristics, or one or more reservoir characteristics.

26. A sensor placement system, comprising:

a transceiver, capable of communicating with a surface controller;

a drilling system, located downhole a borehole through a subterranean formation, wherein the drilling system is capable of drilling a casing hole through a casing of the borehole and drilling into the subterranean formation;

one or more sensors, capable of communicating with the transceiver, being positioned within the subterranean formation and separated from the casing of the borehole, and are coupled to a power source located within the borehole and communicatively coupled to a communication device located within the borehole;

a sealant injection system, capable of injecting a sealant into the casing hole to fluidly seal an inner diameter of the casing and an outer diameter of the casing, wherein the one or more sensors have a first side facing the casing, and the first side of each sensor in the one or more sensors has one or more flow paths allowing the sealant to flow through at least a portion of each sensor in the one or more sensors; and wherein the drilling system, the transceiver, and the sealant injection system are part of a downhole tool.

* * * * *